(12) United States Patent
Yang et al.

(10) Patent No.: US 9,737,956 B2
(45) Date of Patent: Aug. 22, 2017

(54) RESISTANCE SPOT WELDING THIN GAUGE STEELS

(71) Applicant: GM GLOBAL TECHNOLOGY OPERATIONS LLC, Detroit, MI (US)

(72) Inventors: David Yang, Shanghai (CN); Michael J. Karagoulis, Okemos, MI (US); David R. Sigler, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 638 days.

(21) Appl. No.: 13/918,244

(22) Filed: Jun. 14, 2013

(65) Prior Publication Data

US 2014/0367368 A1    Dec. 18, 2014

(51) Int. Cl.
  *B23K 11/10*    (2006.01)
  *B23K 11/11*    (2006.01)
  *B23K 11/16*    (2006.01)
  *B23K 11/00*    (2006.01)

(52) U.S. Cl.
  CPC ......... *B23K 11/115* (2013.01); *B23K 11/0033* (2013.01); *B23K 11/166* (2013.01)

(58) Field of Classification Search
  CPC .. B23K 11/0033; B23K 11/115; B23K 11/166
  USPC .... 219/50, 78.01, 86.01, 86.1, 86.25, 86.33, 219/86.41, 91.2, 91.22, 108, 110, 117.1, 219/118, 119
  See application file for complete search history.

(56) References Cited

U.S. PATENT DOCUMENTS

| | | | | |
|---|---|---|---|---|
| 3,135,854 | A | * | 6/1964 | Deininger, Jr. ...... B23K 11/166 219/92 |
| 8,541,110 | B2 | * | 9/2013 | Chen ................. B23K 11/0033 428/573 |
| 2002/0166843 | A1 | * | 11/2002 | Wang .................... B23K 11/115 219/117.1 |
| 2012/0183800 | A1 | | 7/2012 | Chen et al. |
| 2013/0048613 | A1 | | 2/2013 | Sigler et al. |
| 2013/0327745 | A1 | | 12/2013 | Chen et al. |
| 2014/0305912 | A1 | | 10/2014 | Taniguchi et al. |

FOREIGN PATENT DOCUMENTS

| | | | |
|---|---|---|---|
| CN | 102500901 A | | 6/2012 |
| CN | 102602072 A | | 7/2012 |
| CN | 102950373 A | | 3/2013 |
| JP | 2013111586 | * | 5/2013 |
| JP | 2013111586 | * | 6/2013 |
| JP | 2013111586 A | | 6/2013 |
| JP | 2003251470 A | | 9/2013 |
| KR | 1020100074805 A | | 7/2010 |
| WO | 2013058406 A1 | | 4/2013 |

* cited by examiner

*Primary Examiner* — Dana Ross
*Assistant Examiner* — Joseph Iskra
(74) *Attorney, Agent, or Firm* — Reising Ethington P.C.

(57) ABSTRACT

Resistance spot welding of a thin-gauge steel workpiece to another steel workpiece is achieved through the combined use of specific spot welding electrodes and a pulsating welding current. Each of the spot welding electrodes has a weld face that is smaller in diameter than a typical steel spot welding electrode. And the pulsating welding current that is used in conjunction with the smaller-sized spot welding electrodes includes at least two stages of electrical current pulses.

16 Claims, 6 Drawing Sheets

RESISTANCE SPOT WELDING THIN GAUGE STEELS

TECHNICAL FIELD

The technical field of this disclosure relates generally to resistance spot welding and, more particularly, to resistance spot welding a thin-gauge steel workpiece to another steel workpiece.

BACKGROUND

Resistance spot welding, in general, relies on the resistance to the flow of an electrical current through contacting metal workpieces and across their faying interface to generate heat. To carry out such a welding process, a pair of opposed spot welding electrodes are typically clamped at diametrically aligned spots on opposite sides of the workpieces at a predetermined weld site. A momentary electrical current is then passed through the metal workpieces from one electrode to the other. Resistance to this flow of this electrical current generates heat within the metal workpieces and at their faying interface (i.e., the contacting interface of the metal workpieces). The generated heat initiates a molten weld pool which, upon stoppage of the current flow, solidifies into a weld nugget. After the spot weld is formed, the welding electrodes are retracted from their respective workpiece surfaces, and the spot welding process is repeated at another weld site.

Resistance spot welding has long been used by a number of industries to join together two or more steel workpieces. The automotive industry, for example, often uses resistance spot welding to join together pre-fabricated bare or galvanized steel sheet layers during the manufacture of a vehicle body panel for a door, hood, trunk lid, or lift gate, among others. A number of spot welds are typically formed along a peripheral edge of the steel sheet layers or some other bonding region to ensure the body panel is structurally sound. Because of the recent push to incorporate lighter-weight materials into a vehicle body structure, there is interest in using at least one thin-gauge steel workpiece to fabricate vehicle body panels like the ones listed above.

Conventional bare or galvanized steel spot welding practices have typically employed a weld schedule in which a welding current of constant amperage is continuously passed through the steel workpieces to form the molten weld pool. In particular, a constant welding current lying somewhere between about 4 kA and 20 kA would usually be passed through the steel workpieces for a period of about 70 ms to about 700 ms. Such weld schedule parameters can consistently produce quality weld results so long as none of the steel workpieces being spot welded are less than about 0.8 mm in thickness. But if one or more of the steel workpieces has a thickness below 0.8 mm, down to about 0.6 mm, the prospects of consistently forming an acceptable spot weld begin to diminish with conventional weld schedules, and often necessitate that other enabling welding procedures be implemented such as, among others, as electrode dressing and stiffened gun arms.

Because of high part reject rates, spot welding steel workpieces in which one of the workpieces is less than 0.6 mm in thickness has long been considered unfeasible when using conventional spot welding equipment with a conventional weld schedule that specifies a constant amperage welding current. The main technical problem that proscribes this spot welding practice is the difficulty in controlling the initiation and growth of the molten weld pool in such a thin-gauge steel workpiece. Indeed, the rapid heat build-up in a steel workpiece less than 0.6 mm thick can produce a weld pool that rapidly achieves 100% penetration, thus leading to surface metal expulsion and/or electrode degradation. And in instances where a weld nugget is actually derived and does not burn through the thin-gauge steel workpiece—which is an unpredictable occurrence—the size, location, and structural integrity of the weld nugget is inconsistent. In light of these difficulties, steel workpieces that are less than 0.6 mm thick are usually joined to other workpieces by mechanical techniques such as clinching or self-piercing riveting.

SUMMARY

A thin-gauge steel workpiece—which has a thickness at the weld site down to about 0.3 mm—may be resistance spot welded to another steel workpiece through the combined use of specific spot welding electrodes and a pulsating welding current. The other steel workpiece has a thickness that is equal to or greater than the thin-gauge steel workpiece, meaning that it may be thin-gauge as well, in which case it can have a thickness down to about 0.3 mm, or it may be thicker, for example, up to about 2.0 mm in thickness. Each of the thin-gauge steel workpiece and the other steel workpiece is preferably one of a bare steel workpiece, a galvanized steel workpiece, or an aluminum-coated steel workpieces. In a preferred embodiment, a first galvanized steel workpiece having a thickness at the weld site of about 0.4 mm to about 0.6 mm is resistance spot welded to a second galvanized steel workpiece having a thickness at the weld site of about 0.4 mm to about 2.0 mm.

Each of the spot welding electrodes has a weld face that is smaller in diameter than that of a typical steel spot welding electrode. For example, in a preferred embodiment, the two weld faces have a diameter that ranges from about 3.0 mm to about 4.5 mm. The weld faces may also be flat or have a radius of curvature down to about 15 mm. The pulsating welding current that is to be used in conjunction with such spot welding electrodes, moreover, includes at least two stages of electrical current pulses: (1) a first stage of electrical current pulses (also termed a conditioning stage); and (2) a second stage of electrical current pulses (also termed a weld pool sizing stage). The consecutive execution of the first and second stages of the pulsating welding current permits a molten weld pool to be initiated and grown in a controlled fashion at the faying interface of the steel workpieces.

DETAILED DESCRIPTION

Figure 1:
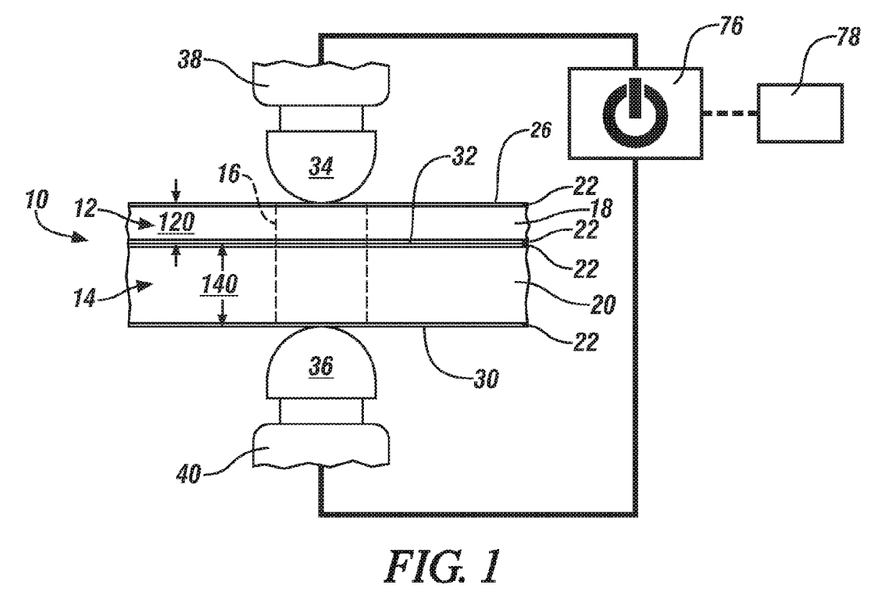
FIG. 1 is a side elevational view of a steel workpiece stack-up that includes a first steel workpiece and second steel workpiece, in which the first steel workpiece has a thickness that is less than about 0.6 mm at the weld site, and a pair of spot welding electrodes.
Figure 2:
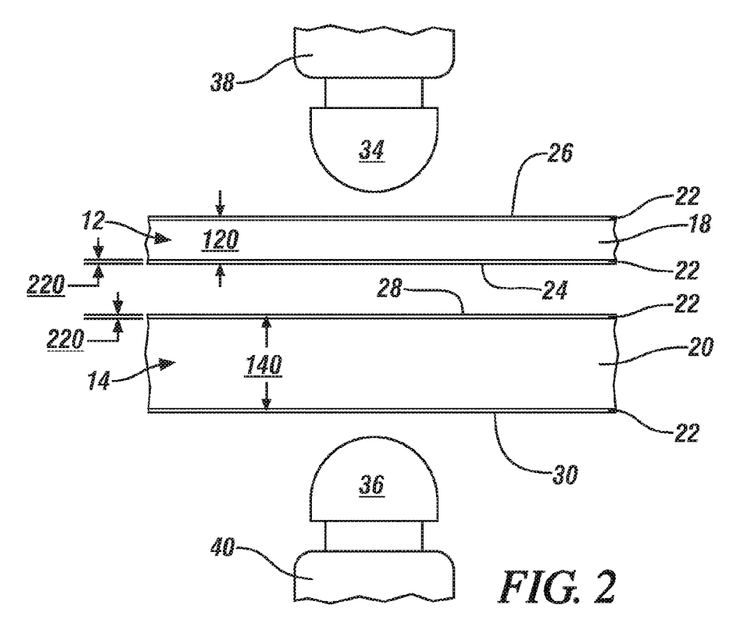
FIG. 2 is an exploded view of the steel workpiece stack-up and the spot welding electrodes shown in FIG. 1.

FIGS. 1-2 generally depict a steel workpiece stack-up 10 that includes a first galvanized steel workpiece 12 and a second galvanized steel workpiece 14. The first and second galvanized steel workpieces 12, 14 are assembled for resistance spot welding at a predetermined weld site 16. Each of the steel workpieces 12, 14 preferably includes a low-carbon steel base layer 18, 20 sandwiched between galvanized zinc coatings 22. The zinc coatings 22 may be applied by hot-dipping or electro-galvanizing, as is well known in the art, and may have a thickness 220 that ranges from about 2 μm to about 16 μm. Other types of steel may of course be present in the workpieces 12, 14 as the steel base layer 18, 20. Some specific types of suitable steels that may be used besides low carbon steel are advanced high-strength steel (AHSS), interstitial-free (IF) steel, bake hardened steel, high-strength low-alloy (HSLA) steel, dual-phase (DP) steel, transformation-induced plasticity (TRIP) steel, martensite steel, and press-hardened steel (PHS).

The first galvanized steel workpiece 12 includes a faying surface 24 and an electrode-contacting surface 26. Likewise, the second galvanized steel workpiece 14 includes a faying surface 28 and an electrode-contacting surface 30. When assembled in the stack-up 10, the faying surfaces 24, 28 of the first and second galvanized steel workpieces 12, 14 overlap and contact one another to provide a faying interface 32. The electrode-contacting surfaces 26, 30 consequently face away from each other in opposite directions.

Each of the first and second galvanized steel workpieces 12, 14 has a thickness 120, 140 at least at the weld site 16 defined by its respective faying surface 24, 28 and electrode-contacting surface 26, 30. The thickness 120 of the first galvanized steel workpiece ranges from about 0.3 mm to about 1.0 mm, and more preferably from about 0.4 mm to about 0.6 mm. The thickness 140 of the second galvanized steel workpiece 14 is equal to or greater than the thickness 120 of the first galvanized steel workpiece 12; that is, depending on the thickness 120 of the first galvanized steel workpiece 12, the thickness 140 of the second galvanized steel workpiece 140 can be as low as about 0.3 mm. In a preferred embodiment, the thickness 140 of the second galvanized steel workpiece 14 lies in the range of about 0.3 mm to about 2.0 mm, and more preferably from about 0.5 mm to about 1.5 mm.

The steel workpiece stack-up 10 is located between a first spot welding electrode 34 and a second welding electrode 36. The first spot welding electrode 34 is supported on a first gun arm 38 (shown partially) and the second spot welding electrode 36 is supported on a second gun arm 40 (shown partially). Each of the spot welding electrodes 34, 36 is formed of a material that exhibits suitable mechanical and electrically-conductive properties. In many instances, for example, the first and second spot welding electrodes 34, 36 are formed of a copper alloy. During spot welding, as will be further described below, the spot welding electrodes 34, 36 are brought into contact and clamped against their respective electrode-contacting surfaces 26, 30 in diametric axial alignment with each other at the weld site 16. The clamping force exerted by each spot welding electrode 34, 36 preferably ranges from about 1 kN to about 4 kN in order to establish good mechanical and electrical contact.

Figure 3:
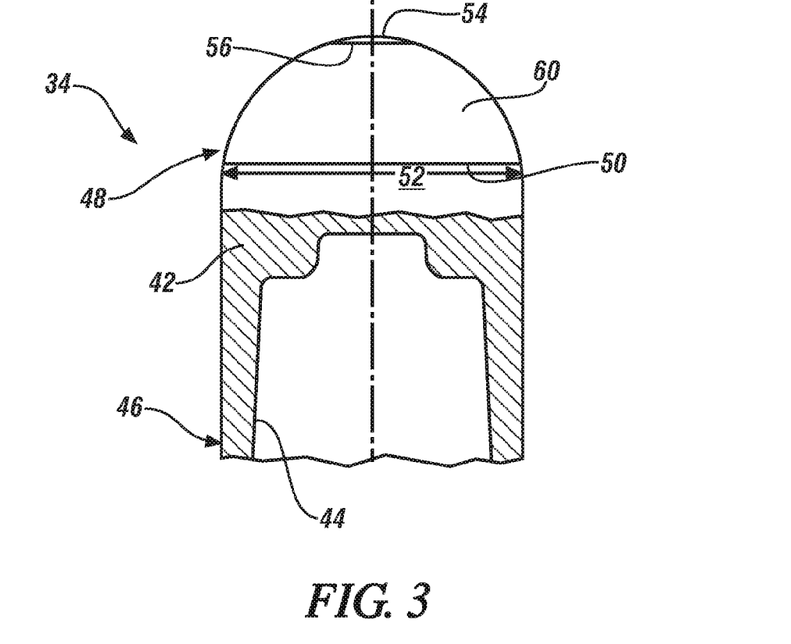
FIG. 3 is partial cross-sectional view of the spot welding electrode shown in FIGS. 1-2 that is intended to contact and apply pressure against an electrode-contacting surface of the first steel workpiece.
Figure 4:
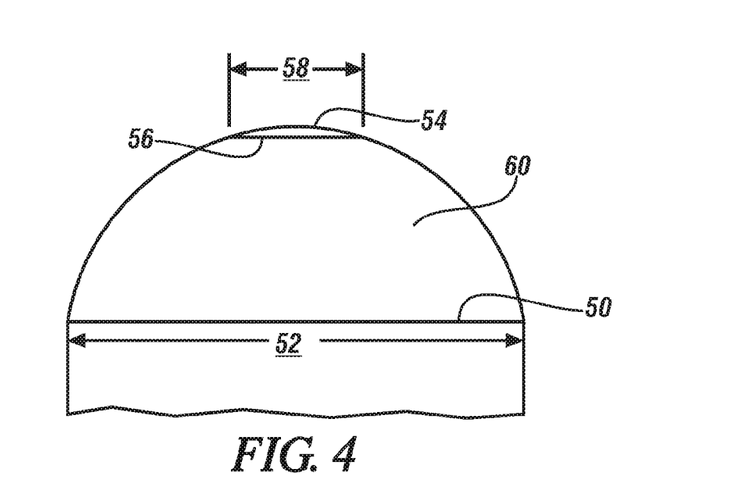
FIG. 4 is partial magnified cross-sectional view of the spot welding electrode shown in FIG. 3.

Referring now to FIGS. 3-4, the first spot welding electrode 34 includes a body 42 that defines a hollow recess 44 accessible at one end 46 to accommodate attachment with the first gun arm 38. The other end 48 of the body 42 has a circumference 50 whose diameter 52 preferably ranges from about 12 mm to about 20 mm. The first spot welding electrode 34 also includes a weld face 54. The weld face 54 has a circumference 56 that is upwardly displaced from, and situated within, the circumference 50 of the body 42, and has a diameter 58 that ranges from about 3.0 mm to about 4.5 mm and, preferably, is about 3.5 mm. Those skilled in the art will appreciate that the circumference 52 of the body 42 and the circumference 56 of the weld face 54 can be parallel, as shown, or offset such that the circumference 56 of the weld face 44 is tilted relative to the circumference 52 of the body 42. The weld face 54 preferably has a geometry that ranges from flat down to a radius of curvature of about 15 mm and, in many cases, has a radius of curvature from about 40 mm to about 50 mm. Additionally, the first spot welding electrode 34 includes a welding nose 60 that transitions from the circumference 50 of the body 42 to the circumference 56 of the weld face 54. The nose 60 may be spherical, as shown, but it can also be elliptical, frusto-conical, or any other desired shape.

Figure 5:
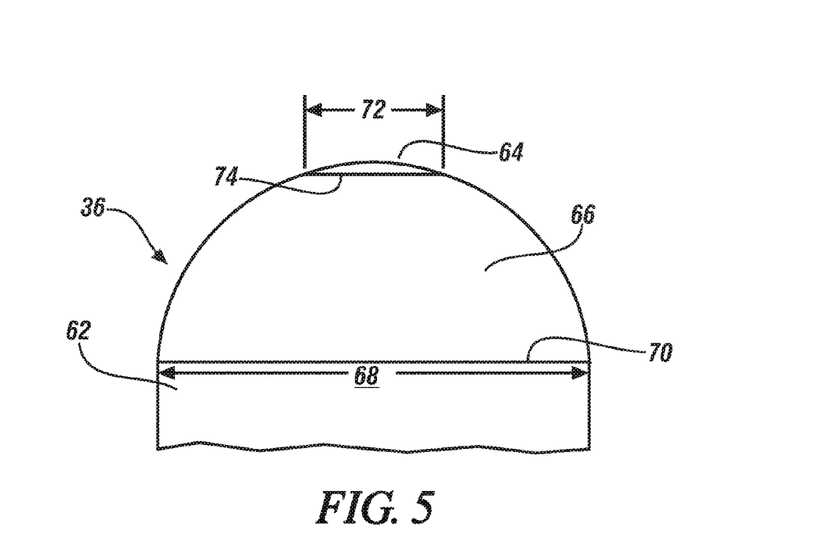
FIG. 5 is partial cross-sectional view of the spot welding electrode shown in FIGS. 1-2 that is intended to contact and apply pressure against an electrode-contacting surface of the second steel workpiece.

The second spot welding electrode 36, as shown in FIG. 5, has the same structural features as the first spot welding electrode—namely, a body 62, a weld face 64, and a nose 66 that transitions between the body 62 and the weld face 64. The dimensions of the second spot welding electrode 36 may be the same as those of the first spot welding electrode 34 regardless of the thickness 140 of the second galvanized steel workpiece 14. In other words, a diameter 68 of a circumference 70 of the body 62 preferably ranges from about 12 mm to about 20 mm, a diameter 72 of a circumference 74 of the weld face 64 is about 3.0 mm to about 4.5 mm, preferably about 3.5 mm, and the weld face 64 is preferably flat or has a radius a radius of curvature down to about 15 mm and, more preferably, has a radius of curvature from about 40 mm to about 50 mm. The dimensions of the second spot welding electrode 36 are the same as those for the first spot welding electrode 34 because the thinnest workpiece in the steel workpiece stack-up 10 dictates the size of the electrodes 34, 36.

The diameters 58, 72 (and consequently the circumferences 56, 74) of the weld faces 54, 64 are smaller than that of a conventional steel spot welding electrode, which typically has a diameter of about 6.0 mm. The smaller-sized weld faces 54, 64 of the first and second spot welding electrodes 34, 36—when used in conjunction with the schedule of electrical current pulses described below—permits the initiation and growth of a molten weld pool at the faying interface 32 (see FIG. 8) to be controlled so that a weld nugget of suitable size and penetration can be formed. Without being bound by theory, it is believed that the smaller-sized weld face 54 reduces the volume and diameter of the molten weld pool, which decreases the thermal gradient into the electrode 34 and increases the thermal gradient in the lateral or sheet direction. These two thermal gradients are thought to control initiation and growth of the molten weld pool.

Referring back to FIG. 1, a welding current power supply 76 applies a controlled voltage to the first and second welding electrodes 34, 36 to provide a pulsating welding current that is passed between the two electrodes 34, 36 and through the first and second galvanized steel workpieces 12, 14 at the weld site 16 during spot welding in accordance with a specified weld schedule. The welding current power supply 76 is preferably a medium-frequency DC (MFDC) power supply. A MFDC power supply generally includes a transformer and a rectifier. The transformer "steps down" an input AC voltage of about 1000 Hz to generate a lower-voltage, higher-amperage AC current which is then fed to the rectifier where a collection of semiconductor diodes converts the supplied AC current into a DC current. Such a power supply component is commercially available from a number of suppliers including ARO Welding Technologies (US headquarters in Chesterfield Township, Mich.) and Bosch Rexroth (US headquarters in Charlotte, N.C.).

To execute the weld schedule, a programmable spot welding process controller 78 interfaces with the welding current power supply 76 to control the timing and magnitude of the pulsating welding current. Specifically, the welding process controller 78 is programmed to instruct the welding current power supply 76 to deliver a pulsating welding current for passage between the first and second spot welding electrodes 34, 36 that includes at least two stages of electrical current pulses: (1) a first stage of electrical current pulses (also termed a conditioning stage); and (2) a second stage of electrical current pulses (also termed a weld pool sizing stage). Each of the conditioning stage and the weld pool sizing stage preferably comprises a minimum of two electrical current pulses.

During the conditioning stage, one or more pulses of electrical current are provided to reduce several contact resistances situated between the electrodes 34, 36 at the weld site 16 to a lower, more predictable value, and to settle the electrodes 34, 36 into intimate contact with their respective electrode-contacting surfaces 26, 30. The pulses of electrical current passed during the conditioning stage are generally insufficient to grow a stable molten weld pool. But by the end of the conditioning stage, the pulses of electrical current can, and preferably do, initiate a small molten weld pool no greater than about half the specified minimum size for the two workpieces 12, 14 at the faying interface 32 for subsequent growth activity. Then, during the weld pool sizing stage, which follows the conditioning stage in short order, one or more pulses of electrical current are provided which are sufficient to continue controlled growth of the initiated molten weld pool to its final size in the recently-stabilized and reduced resistance regime achieved by the conditioning stage. A welding process controller 44 that can execute such a weld schedule is commercially available from a number of suppliers including Welding Technology Corporation (Farmington Hills, Mich.).

Figure 6:
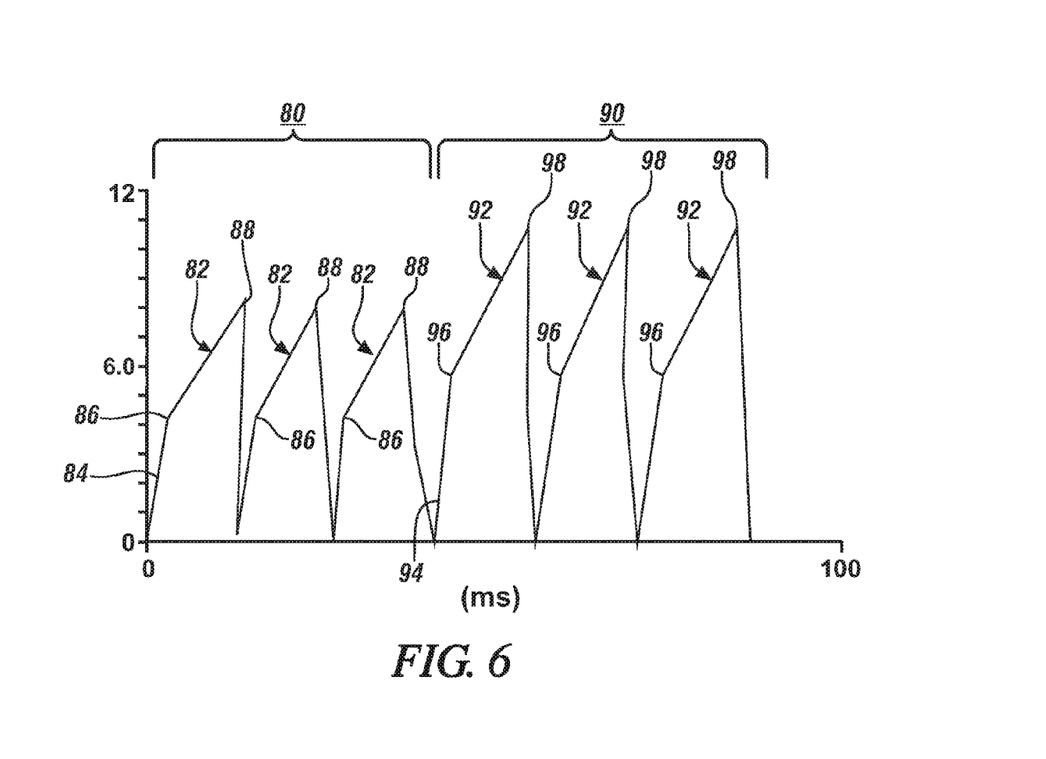
FIG. 6 is a graph illustrating the relevant aspects of a generalized steel spot welding schedule in which a pulsating welding current is passed through the steel workpieces to form the molten weld pool.

A more detailed and graphical depiction of the pulsating welding current that is used to effectuate spot welding of the first and second steel workpieces 12, 14 is shown generally in FIG. 6. As shown, in the conditioning stage, which is represented by numeral 80, one or more pulses of electrical current 82 are provided that have an amperage 84 which rises to an initial amperage 86. The initial amperage 86 preferably lies anywhere between about 3 kA and about 7.5 kA. From there, over a duration of about 1 ms to about 15 ms, the amperage 84 of the pulses 82 ramps up to a peak amperage 88 that preferably lies anywhere between about 6 kA and about 8.5 kA. The amperage 84 then drops to below 1 kA, and preferably 0 kA, for a duration of about 1 ms to about 3 ms. It should be noted that the pulses of electrical current 82 generated during the conditioning stage 80 do not necessarily have to be the same as depicted in FIG. 5. Each individual pulse 82 may have different initial and peak amperages 86, 88 as well as different time durations between attainment of those amperages 86, 88. Moreover, other types of electrical current pulses that ramp up may also be included in the conditioning stage 80 besides the ones expressly depicted. Still further, an electrical current pulse that rises to a singularly constant amperage (i.e., the initial amperage is the peak amperage) may also be present, if desired.

The weld pool sizing stage, which is represented by numeral 90, preferably begins less than 8 ms, and most preferably less than 3 ms, after completion of the condition stage 80 so that the elevated core temperature of the small initiated molten weld pool does not have time to fully dissipate into the electrodes 34, 36. In the weld pool sizing stage 90, one or more pulses of electrical current 92 are provided that have an amperage 94 which rises to an initial amperage 96. The initial amperage 96 preferably lies anywhere between about 5 kA and about 8 kA. The amperage 94 of the pulses 92 then ramps up, over a duration of about 15 ms to about 30 ms, to a peak amperage 98 that preferably lies anywhere between about 9 kA and about 12 kA. The magnitude and duration of these pulses 92 are sufficient to grow the molten weld pool initiated at the end of the conditioning stage 80 in a manageable way. Indeed, after achieving the peak amperage 98, the amperage 94 drops to below 1 kA, and preferably 0 kA, for a duration of about 1 ms to about 3 ms, to intermittently allow the skin around the molten weld pool to briefly cool without solidifying the weld pool itself. The weld pool sizing stage 90 is eventually terminated once the molten weld pool has achieved a suitable size and penetration. It should be noted that—like before with respect to the conditioning stage 80—the pulses of electrical current 92 generated during the weld pool sizing stage 90 do not necessarily have to be the same, and that other types of electrical current pulses can be present so long as they do not disrupt the manageable growth of a molten weld pool.

Figure 7:
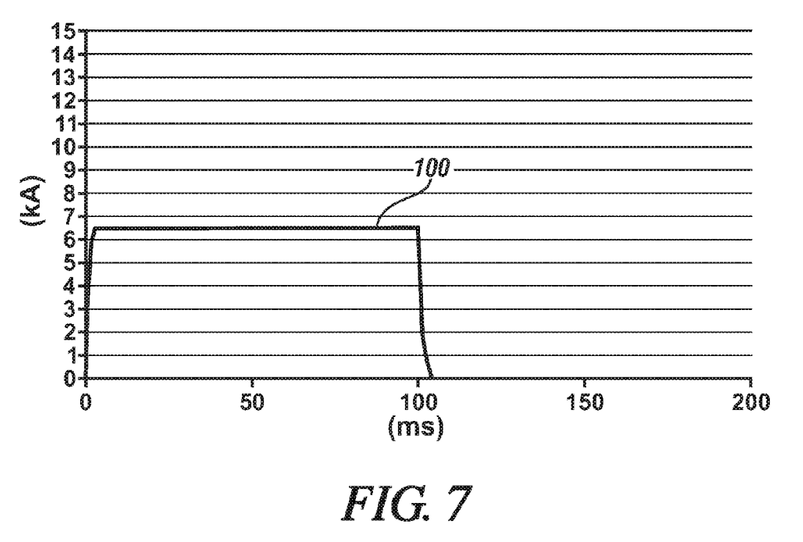
FIG. 7 is a graph illustrating the relevant aspects of a conventional steel spot welding schedule in which a welding current of constant amperage is continuously passed through the steel workpieces to form the molten weld pool.

The pulsating welding current used to spot weld the thin-gauge first galvanized steel workpiece 12 to the second galvanized steel workpiece 14 (which can also be of thin-gauge), and which may also be used with other types of steel workpieces, is rather distinct from customary steel spot welding schedules. For instance, referring now to FIG. 7, a customary galvanized steel spot welding schedule would typically call for an electrical current 100 of constant amperage, usually between 4 kA and 10 kA, to be continuously passed through the galvanized steel workpieces being welded over a duration of roughly 70 ms to 700 ms. But this type of weld current schedule has generally been considered ineffective when at least one of the galvanized steel workpieces is less than 0.6 mm thick at the weld site due to the inability, within the context of the scheduled welding current command, to control the rapid heat flow and molten weld pool growth progressing through the thin-gauge workpiece.

Figure 8:
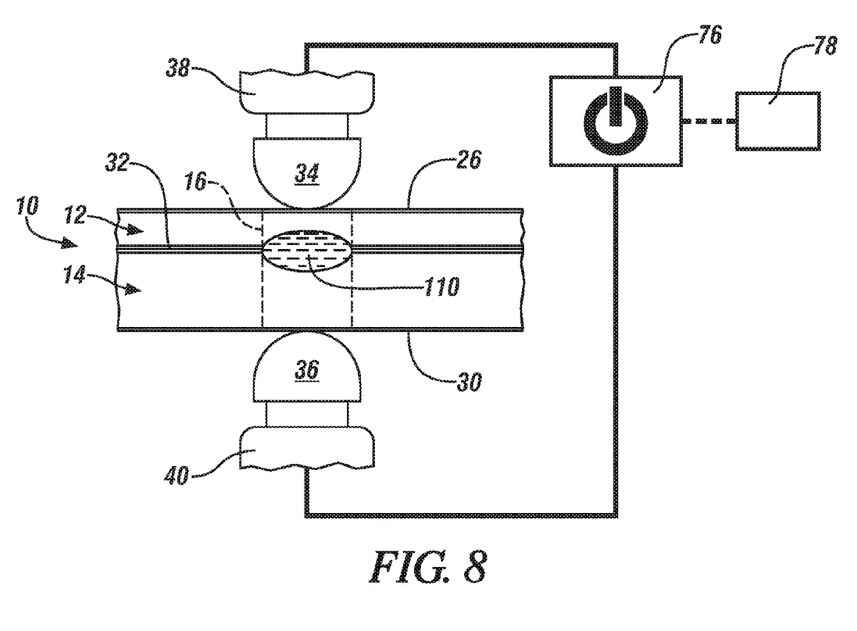
FIG. 8 is a cross-sectional view of a steel workpiece stack-up that includes a first steel workpiece and a second steel workpiece during spot welding.
Figure 9:
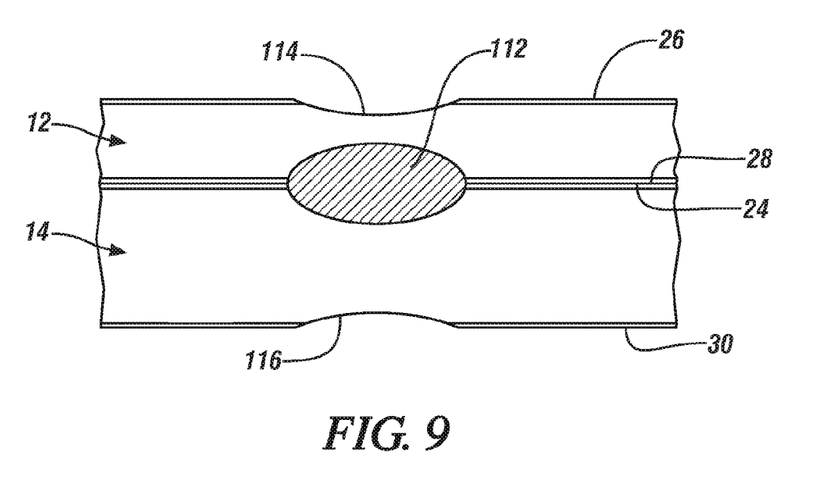
FIG. 9 is a cross-sectional view of the steel workpiece stack-up shown in FIG. 8 after spot-welding has occurred.

A preferred embodiment of a spot welding process in accordance with the above discussion is shown generally in FIGS. 8-9 for the steel workpiece stack-up 10. To begin, the steel workpiece stack-up 10 is located between the first and second welding electrodes 34, 36 so that the weld site 16 is generally aligned with the opposed weld faces 54, 64 (FIGS. 4 and 5). The workpiece stack-up 10 may be brought to such a location, as is often the case when the gun arms 38, 40 are part of a stationary pedestal welder, or the gun arms 38, 40 may be robotically moved to locate the electrodes 34, 36 relative to the weld site 16. Once the stack-up 10 is properly located, the weld face 54 of the first spot welding electrode 34 is brought into contact with the electrode-contacting surface 26 of the first galvanized steel workpiece 12 and the weld face 64 of the second spot welding electrode 36 is brought into contact with the electrode-contacting surface 30 of the second galvanized steel workpiece 14. The first and second welding electrodes 34, 36 are converged at the weld site 16 to clamp the weld faces 54, 64 against their respective workpiece surfaces 26, 30 in diametric alignment to establish acceptable mechanical and electrical contact for spot welding.

The pulsating welding current is then passed between the weld faces 54, 64 of the first and second welding electrodes 34, 36 to initiate and grow a molten weld pool 110 at the faying interface 32 of the workpieces 12, 14 at the weld site 16. The pulsating welding current is delivered by the welding current power supply 76 in accordance with instructions programmed into the programmable spot welding process controller 78. Skilled artisans will know how to electrically couple the welding current power supply 76 to the spot welding electrodes 34, 36 and, additionally, how to set up the spot welding process controller 78 to interface with the power supply 76 so that the pulsating welding current can be accurately delivered.

The pulsating welding current, as discussed above and generally illustrated in FIG. 6, includes the conditioning stage 80 followed by the weld pool sizing stage 90. The role of the conditioning stage 80 is to commence the passage of low-amperage electrical current pulses between the electrodes 34, 36 without causing expulsion of the steel and to gradually improve the tolerance of the weld site 16 for higher current flow by reducing the following resistances: the interface of the first weld face 54 and the electrode-contacting surface 26 of the first galvanized steel workpiece 12, the faying interface 32, and the interface of the second weld face 64 and the electrode-contacting surface 30 of the second galvanized steel workpiece 12. The role of the weld pool sizing stage 90 is to be the component of the pulsating welding current that actually grows and sizes the molten weld pool 110 at the faying interface 32 in a controlled fashion without the occurrence of expulsion.

During the conditioning stage 80, the one or more pulses of electrical current 82 are sequentially passed between the electrode weld faces 54, 64 and through the workpieces 12, 14 at the weld site 16. The amperage 84 of each of the pulses of electrical current 82 rises to the initial amperage 86 (preferably between about 3 kA and about 7.5 kA). This initially low current of each pulse 82 is designed to allow current to flow through the weld site 16 without inducing expulsion. Then, over a duration of about 1 ms to about 15 ms, the amperage 84 ramps up to its peak amperage 88 (preferably between about 6 kA and about 8.5 kA), and finally drops to below about 1 kA. After a pulse 82 has fallen below 1 kA, about 1 ms to about 3 ms elapses until the next pulse of electrical current 82 begins to rise to its initial amperage 86. Eventually, by the end of the conditioning stage 80, a small molten weld pool 110 is preferably initiated for subsequent growth and sizing during the weld pool sizing stage 90. The entirety of the conditioning stage usually lasts about 20 ms to about 50 ms.

During the weld pool sizing stage 90, the one or more pulses of electrical current 92 are sequentially passed between the electrode weld faces 54, 64 and through the workpieces 12, 14 at the weld site 16. The amperage 94 of each of the pulses of electrical current 92 rises to the initial amperage 96 (preferably between about 5 kA and about 8 kA). Again, like before, the initially low current of each pulse 92 is designed to allow current to flow through the weld site 16 without inducing expulsion. Then, over a duration of about 15 ms to about 30 ms, the amperage 94 ramps up to its peak amperage 98 (preferably between about 9 kA and about 12 kA), and finally drops to below 1 kA (preferably 0 kA). The first pulse of electrical current 92 in the weld pool sizing stage 90 is scheduled to begin no more than 8 ms (preferably no more than 3 ms) after the last pulse of electrical current 82 in the conditioning stage 80 falls below 1 kA. And within the weld pool sizing stage 90, each pulse of electrical current 92 begins to rise to its initial amperage 96 about 1 ms to about 3 ms after the previous pulse 92 has fallen below 1 kA. The entirety of the weld pool sizing stage 90 usually lasts about 30 ms to about 60 ms.

The one or more electrical current pulses 92 in the weld pool sizing stage 90 have a great enough magnitude and are sustained for a long enough duration to heat and grow the molten weld pool 110 in a controlled fashion. In particular, the ramping up of each pulse 92 causes the molten weld pool 110 to grow, while the duration between electrical current pulses 92 allows the skin of the molten weld pool 110 to cool briefly without solidifying the weld pool 110 itself, which has the effect of constraining the type of unbridled growth that might normally occur in response to a conventional galvanized steel spot welding schedule. In this way, the penetration of the molten weld pool 110 into the first and second galvanized steel workpieces 12, 14 can be managed to achieve a successful and consistently repeatable spot weld between the two workpieces 12, 14.

After stoppage of the pulsating welding current, the molten weld pool 110 solidifies into a weld nugget 112, as illustrated generally in FIG. 9. The weld nugget 112 may penetrate a distance that ranges from about 20% to about 90% of the thickness 120 of the first galvanized steel workpiece 12 from its faying surface 24 towards its electrode-contacting surface 26. For the second galvanized steel workpiece 14, the penetration may be in the same range. Soon after stoppage of the pulsating welding current, the first and second welding electrodes 34, 36 are retracted from the steel workpiece stack-up 10, leaving behind impressed contact patches 114, 116 on their respective electrode-contacting surfaces 26, 30. The stack-up 60 is then re-located between the first and second welding electrodes 34, 36 at a different weld site 14, or it is moved away so that another steel workpiece stack-up 10 can be located for spot welding. More spot welds are then formed in the same way.

EXAMPLES

These examples demonstrate the use of a pulsating welding current to resistance spot weld a steel workpiece stack-up that includes at least one thin-gauge galvanized steel workpiece. In the first example, which corresponds to FIG. 10, a 0.5 mm thick hot-dip galvanized low carbon steel workpiece was resistance spot welded to another 0.5 mm thick hot-dip galvanized low carbon steel workpiece. The two spot welding electrodes used to engage the steel workpieces were water-cooled, copper alloy electrodes that had been dressed by an appropriate dressing blade to have a weld face diameter of about 3.5 mm and a radius of curvature of about 40 mm. The two welding electrodes were clamped against opposite sides of the stack-up at a weld site at a clamping force of about 1.4 kN.

Figure 10:
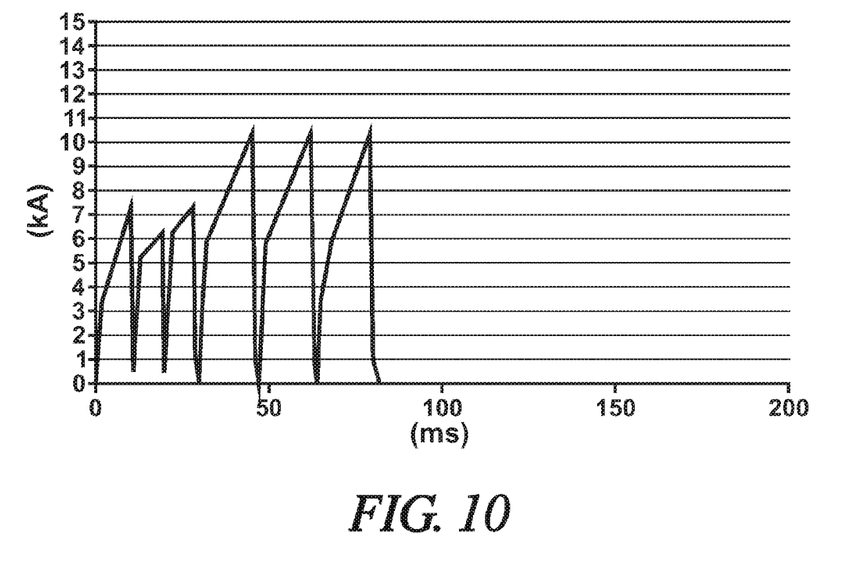
FIG. 10 is a graph illustrating the relevant aspects of a galvanized steel spot welding schedule, according to one embodiment, in which a pulsating welding current is passed through the steel workpieces to form the molten weld pool.

Once the two spot welding electrodes were in place, a pulsating welding current was passed between the electrodes and through the stack-up at the weld site as shown in FIG. 10. The conditioning stage of the pulsating welding current, as shown, included three ramped pulses of electrical current. The first pulse achieved an initial amperage of about 3.3 kA and then ramped up to a peak amperage of about 7.3 kA over a duration of about 8 ms. The second pulse achieved an initial amperage of about 5.3 kA and then ramped up to a peak amperage of about 6.3 kA over a duration of about 6 ms. And the third pulse achieved an initial amperage of about 6.3 kA and then ramped up to a peak amperage of about 7.3 kA over a duration of about 6 ms. The amperage of the pulsating welding current dropped to about 0.5 kA between the first and second pulses and the second and third pulses for about 1 ms. The conditioning stage of the pulsating welding current lasted about 30 ms.

After the third pulse of the conditioning stage, the amperage dropped to 0 kA for about 1 ms, after which time the weld pool sizing stage began. Here, as shown, the weld pool sizing stage included three ramped pulses of electrical current. The first two pulses achieved initial amperages of about 5.8 kA and then ramped up to peak amperages of about 10.3 kA over a duration of about 13 ms, while the third pulse achieved an initial amperage of about 5.8 and then ramped up to a peak amperage of about 10.3 kA over a duration of about 11 ms. The weld pool sizing stage of the pulsating welding current lasted about 52 ms. Following termination of the pulsating welding current after the weld pool sizing stage, a suitable weld nugget at the faying interface of the two 0.5 mm thick hot-dip galvanized low carbon steel workpieces was observed without the occurrence of expulsion.

Figure 11:
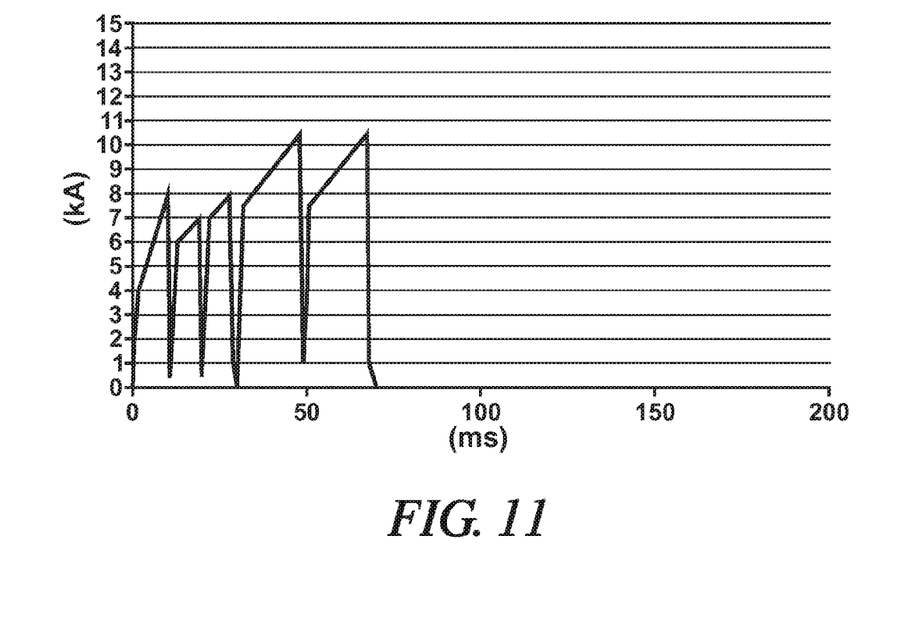
FIG. 11 is a graph illustrating the relevant aspects of a galvanized steel spot welding schedule, according to another embodiment, in which a pulsating welding current is passed through the steel workpieces to form the molten weld pool.

The second example is similar to the first example except that, here, a 0.5 mm thick hot-dip galvanized low carbon steel workpiece was resistance spot welded to a 1.0 mm thick hot-dip galvanized low carbon steel workpiece. A pulsating welding current was passed between the electrodes and through the stack-up at the weld site as shown in FIG. 11. The conditioning stage of the pulsating welding current included three pulses of electrical current and the weld pool sizing stage included two pulses.

In the conditioning stage, the first pulse achieved an initial amperage of about 3.9 kA and then ramped up to a peak amperage of about 7.9 kA over a duration of about 8 ms. The second pulse achieved an initial amperage of about 5.9 kA and then ramped up to a peak amperage of about 6.9 kA over a duration of about 6 ms. And the third pulse achieved an initial amperage of about 6.9 kA and then ramped up to a peak amperage of about 7.9 kA over a duration of about 6 ms. The amperage of the pulsating welding current dropped to about 0.5 kA between the first and second pulses and the second and third pulses for about 1 ms. The conditioning stage of the pulsating welding current lasted about 30 ms.

After the third pulse of the conditioning stage, the amperage of the pulsating welding current dropped to 0 kA for about 1 ms, after which time the weld pool sizing stage began. Here, as shown, the weld pool sizing stage included two pulses of electrical current. Each of those pulses achieved initial amperages of about 7.4 kA and then ramped up to peak amperages of about 10.4 kA over a duration of about 16 ms. The weld pool sizing stage of the pulsating welding current lasted about 40 ms. Following termination of the pulsating welding current after the weld pool sizing stage, a suitable weld nugget at the faying interface of the 0.5 mm thick hot-dip galvanized low carbon steel workpiece and the 1.0 mm thick hot-dip galvanized low carbon steel workpiece was observed without the occurrence of expulsion.

Figure 12:
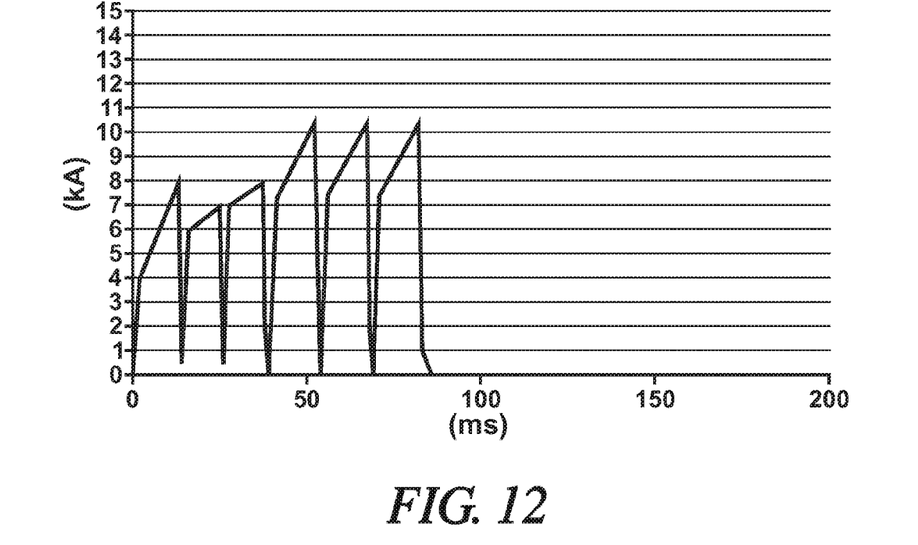
FIG. 12 is a graph illustrating the relevant aspects of a galvanized steel spot welding schedule, according to yet another embodiment, in which a pulsating welding current is passed through the steel workpieces to form the molten weld pool.

The third example is similar to the first example except that, here, a 0.5 mm thick hot-dip galvanized low carbon steel workpiece was resistance spot welded to a 1.5 mm thick hot-dip galvanized low carbon steel workpiece. A pulsating welding current was passed between the electrodes and through the stack-up at the weld site as shown in FIG. 12. Each of the conditioning stage and the weld pool sizing stage of the pulsating welding current included three pulses of electrical current.

In the conditioning stage, the first pulse achieved an initial amperage of about 3.9 kA and then ramped up to a peak amperage of about 7.9 kA over a duration of about 11 ms. The second pulse achieved an initial amperage of about 5.9 kA and then ramped up to a peak amperage of about 6.9 kA over a duration of about 9 ms. And the third pulse achieved an initial amperage of about 6.9 kA and then ramped up to peak amperage of about 7.9 kA over a duration of about 9 ms. The amperage of the pulsating welding current dropped to about 0.5 kA between the first and second pulses and the second and third pulses for about 1 ms. The conditioning stage of the pulsating welding current lasted about 39 ms.

After the third pulse of the conditioning stage, the amperage of the pulsating welding current dropped to 0 kA for about 1 ms, after which time the weld pool sizing stage began. Here, as shown, the weld pool sizing stage included three pulses of electrical current. Each of those pulses achieved initial amperages of about 7.4 kA and then ramped up to peak amperages of about 10.4 kA over a duration of about 11 ms. The weld pool sizing stage of the pulsating welding current lasted about 45 ms. Following termination of the pulsating welding current after the weld pool sizing stage, a suitable weld nugget at the faying interface of the 0.5 mm thick hot-dip galvanized low carbon steel workpiece and the 1.5 mm thick hot-dip galvanized low carbon steel workpiece was observed without the occurrence of expulsion.

The above description of preferred exemplary embodiments and related examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a thin-gauge steel workpiece to another steel workpiece, the method comprising:
  providing a steel workpiece stack-up that includes a first steel workpiece and a second steel workpiece that overlap to form a faying interface between the two steel workpieces at a predetermined weld site, the first steel workpiece having a thickness that ranges from about 0.3 mm to about 1.0 mm at least at the weld site and the second steel workpiece having a thickness that is equal to or greater than the thickness of the first steel workpiece at least at the weld site;

clamping the steel workpiece stack-up between a first spot welding electrode, which is brought into contact with the first steel workpiece, and a second spot welding electrode, which is brought into contact with the second steel workpiece, the first spot welding electrode having a first weld face that has a diameter that ranges from about 3.0 mm to about 4.5 mm, the second spot welding electrode having a second weld face that has a diameter that ranges from about 3.0 mm to about 4.5 mm, each of the first and second weld faces being flat or having a radius of curvature down to about 15 mm, the first and second weld faces being diametrically opposed from each other when clamped onto the steel workpiece stack-up;

passing a first stage of one or more pulses of electrical current through the steel workpiece stack-up and between the first and second weld faces at the weld site, each of the pulses of electrical current in the first stage achieving a peak amperage; and passing a second stage of one or more pulses of electrical current through the steel workpiece stack-up and between the first and second weld faces at the weld site after passing the first stage of one or more pulses of electrical current, wherein the second stage of one or more pulses of electrical current grows a molten weld pool at the faying interface of the first and second steel workpieces that was initiated during the first stage, each of the one or more pulses of electrical current in the second stage achieving an initial amperage between about 5 kA and about 8 kA and then ramping up to a peak amperage between about 9 kA and about 12 kA, wherein each of the one or more pulses of electrical current in the second stage ramps up from the initial amperage to the peak amperage over a duration of about 15 ms to about 30 ms, and wherein the peak amperage of each of the one or more pulses of electrical current in the second stage is greater than a peak amperage of each of the one or more pulses of electrical current in the first stage.

2. The method set forth in claim 1, wherein the at least one of the first steel workpiece or the second steel workpiece is a galvanized steel workpiece.

3. The method set forth in claim 2, wherein the first steel workpiece and the second steel workpiece are galvanized steel workpieces, and the thickness of the first steel workpiece ranges from about 0.4 mm to about 0.6 mm and the thickness of the second steel workpiece ranges from about 0.4 mm to about 2.0 mm.

4. The method set forth in claim 1, wherein each of the one or more pulses of electrical current in the first stage achieves an initial amperage and then ramps up to the peak amperage.

5. The method set forth in claim 4, wherein the initial amperage of each of the one or more pulses of electrical current in the first stage is between about 3 kA and about 7.5 kA, wherein the peak amperage of each of the one or more pulses of electrical current in the first stage is between about 6 kA and about 8.5 kA, and wherein each of the one or more pulses of electrical current in the first stage ramps up from the initial amperage to the peak over a duration of about 1 ms to about 15 ms.

6. The method set forth in claim 1, wherein the first stage of electrical current pulses has a duration of about 20 ms to about 50 ms, and wherein the second stage of electrical current pulses has a duration of about 30 ms to about 60 ms.

7. A method of resistance spot welding a thin-gauge steel workpiece to another steel workpiece, the method comprising:

providing a steel workpiece stack-up that includes a first steel workpiece and a second steel workpiece that overlap to form a faying interface between the two steel workpieces at a predetermined weld site, the first steel workpiece having a thickness that ranges from about 0.3 mm to about 1.0 mm;

clamping the steel workpiece stack-up between a first spot welding electrode, which is brought into contact with the first steel workpiece, and a second spot welding electrode, which is brought into contact with the second steel workpiece, the first spot welding electrode having a first weld face that has a diameter that ranges from about 3.0 mm to about 4.5 mm, the second spot welding electrode having a second weld face that has a diameter that ranges from about 3.0 mm to about 4.5 mm, each of the first and second weld faces being flat or having a radius of curvature down to about 15 mm, the first and second weld faces being diametrically opposed from each other when clamped onto the steel workpiece stack-up; and forming a molten weld pool at the faying interface of the first and second sheet metal workpieces by passing a pulsating welding current through the steel workpiece stack-up and between the first and second weld faces at the weld site according to a weld schedule in which: (1) a conditioning stage of the pulsating welding current that includes one or more pulses of electrical current is passed through the steel workpiece stack-up, the pulses of electrical current in the conditioning stage being sufficient to initiate the molten weld pool, and (2) a weld pool sizing stage of the pulsating welding current that includes one or more pulses of electrical current is passed through the steel workpiece stack-up after the conditioning stage, the pulses of electrical current in the weld pool sizing stage being sufficient to grow the molten weld pool to a final size;

wherein each of the one or more pulses of electrical current in the conditioning stage achieves a peak amperage between about 6 kA and about 8.5 kA, wherein each of the one or more pulses of electrical current in the weld pool sizing stage achieves a peak amperage between about 9 kA and about 12 kA, wherein each of the one or more pulses of electrical current in the conditioning stage ramps up to its peak amperage from an initial amperage of between about 3 kA and about 7.5 kA over a duration of about 1 ms to about 15 ms, and wherein each of the one or more pulses of electrical current in the weld pool sizing stage ramps up to its peak amperage from an initial amperage of about 5 kA to about 8 kA over a duration of about 15 ms to about 30 ms.

8. The method set forth in claim 7, wherein the thickness of the first steel workpiece is about 0.3 mm to about 0.6 mm, and wherein the second steel workpiece has a thickness that is about 0.4 mm to about 2.0 mm.

9. The method set forth in claim 7, wherein each of the one or more pulses of electrical current in the conditioning stage drops to an amperage below about 1 kA after ramping up to its peak amperage, wherein each of the one or more pulses of electrical current in the weld pool sizing stage drops to an amperage below about 1 kA after ramping up to its peak amperage, and wherein a first pulse of electrical current in the weld pool sizing stage begins no more than about 8 ms after a last pulse of electrical current in the conditioning stage drops below about 1 kA.

10. The method set forth in claim 9, wherein each of the pulses of electrical current in the weld pool sizing stage begins to rise to its initial amperage about 1 ms to about 3 ms after a previous electrical current pulse in the weld pool sizing stage has fallen below about 1 kA.

11. The method set forth in claim 7, wherein the conditioning stage of electrical current pulses has a duration of about 20 ms to about 50 ms, and wherein the weld pool sizing stage of electrical current pulses has a duration of about 30 ms to about 60 ms.

12. A method of resistance spot welding a thin-gauge steel workpiece to another steel workpiece, the method comprising:

provviding a steel workpiece stack-up that includes a first steel workpiece and a second steel workpiece that overlap to form a faying interface between the two steel workpieces at a predetermined weld site, the first steel workpiece having a thickness that ranges from about 0.3 mm to about 1.0 mm at least at the weld site and the second steel workpiece having a thickness that is equal to or greater than the thickness of the first steel workpiece at least at the weld site;

clamping the steel workpiece stack-up between a first spot welding electrode, which is brought into contact with the first steel workpiece, and a second spot welding electrode, which is brought into contact with the second steel workpiece, the first spot welding electrode having a first weld face that has a diameter that ranges from about 3.0 mm to about 4.5 mm, the second spot welding electrode having a second weld face that has a diameter that ranges from about 3.0 mm to about 4.5 mm, each of the first and second weld faces being flat or having a radius of curvature down to about 15 mm, the first and second weld faces being diametrically opposed from each other when clamped onto the steel workpiece stack-up;

passing a first stage of one or more pulses of electrical current through the steel workpiece stack-up and between the first and second weld faces at the weld site, each of the one or more pulses of electrical current in the first stage achieving an initial amperage between about 3 kA and about 7.5 kA and then ramping up to a peak amperage between about 6 kA and about 8.5 kA, and wherein each of the one or more pulses of electrical current in the first stage ramps up from the initial amperage to the peak amperage over a duration of about 1 ms to about 15 ms; and passing a second stage of one or more pulses of electrical current through the steel workpiece stack-up and between the first and second weld faces at the weld site after passing the first stage of one or more pulses of electrical current, each of the pulses of electrical current in the second stage achieving a greater peak amperage than each of the pulses of electrical current in the first stage, and wherein the second stage of one or more pulses of electrical current grows a molten weld pool at the faying interface of the first and second steel workpieces that was initiated during the first stage.

13. The method set forth in claim 12, wherein each of the one or more pulses of electrical current in the second stage achieves an initial amperage and then ramps up to a peak amperage.

14. The method set forth in claim 13, wherein the initial amperage of each of the one or more pulses of electrical current in the second stage is between about 5 kA and about 8 kA, wherein the peak amperage of each of the one or more pulses of electrical current in the second stage is between about 9 kA and about 12 kA, and wherein each of the one or more pulses of electrical current in the second stage ramps up from the initial amperage to the peak amperage over a duration of about 15 ms to about 30 ms.

15. The method set forth in claim 12, wherein at least one of the first steel workpiece or the second steel workpiece is a galvanized steel workpiece.

16. The method set forth in claim 12, wherein the first stage of electrical current pulses has a duration of about 20 ms to about 50 ms, and wherein the second stage of electrical current pulses has a duration of about 30 ms to about 60 ms.

* * * * *